United States Patent
Brainard et al.

[15] 3,661,463
[45] May 9, 1972

[54] SINGLE INTERFEROMETER MULTIPLE AXIS LASER MEASURING SYSTEM

[72] Inventors: Wallace E. Brainard, New Berlin; Charles B. Sipek, Hales Corners, both of Wis.

[73] Assignee: Kearney & Trecker Corporation, West Allis, Wis.

[22] Filed: Mar. 5, 1970

[21] Appl. No.: 16,848

[52] U.S. Cl. .................................... 317/106, 350/287
[51] Int. Cl. ......................................... G01b 9/02, G02b 7/18
[58] Field of Search ................................................ 356/106

[56] References Cited

UNITED STATES PATENTS

| | | | |
|---|---|---|---|
| 3,515,481 | 6/1970 | Brault et al. | 356/106 |
| 3,377,111 | 4/1968 | Brault | 356/106 |

*Primary Examiner*—Ronald L. Wibert
*Assistant Examiner*—Conrad Clark
*Attorney*—William C. Gleisner, Cyril M. Hajewski and Donald E. Porter

[57] ABSTRACT

This invention relates to an extremely accurate measuring system comprising a single laser interferometer and associated single counting apparatus responsive to a multiple axis laser beam reflectively connected to measure one of a plurality of different movements in a multiple axis machine tool. Preferably, the measuring apparatus is incorporated in a machine tool having a frame provided with a worktable movable along an X axis relative to an upright column mounted on the frame for transverse movement along a Z axis. The upright is disposed to carry a spindle head for movement along a vertical or Y axis to effect selective movement of a cutter relative to an associated workpiece mounted on the worktable in the usual manner.

21 Claims, 11 Drawing Figures

INVENTOR
CHARLES B. SIPEK
BY William C. Gleisner Jr.
ATTORNEY

INVENTOR
CHARLES B. SIPEK
BY *William C. Gleisner Jr.*
ATTORNEY

SINGLE INTERFEROMETER MULTIPLE AXIS LASER MEASURING SYSTEM

A single laser interferometer mounted on the worktable projects a single, variable length output measuring beam along the X axis of movement of that element. The initial X axis output beam segment from the interferometer is reflected by a fixed prismatic beam bender on the frame along the Z axis of movement of the associated transversely movable column. Next, the transverse Z axis output beam segment is reflected by another prismatic beam bender on the column in a vertically upward direction along the Y axis. A corner cube or retroreflector on the vertically movable spindle head receives the Y axis output beam segment and reflectively directs a parallel Y axis return beam segment to the column mounted beam bender. The Y axis return beam segment is then reflected by the column beam bender along a transverse Z axis parallel to the Z axis output beam segment. Next, the Z axis return beam is reflected transversely along an X axis return beam path parallel to the X axis output beam segment. The single, multiple axis returned beam is then recombined with a single fixed length reference beam to provide interference patterns connected to actuate two photodetectors.

Thus, a single interferometer on the worktable is operable to provide a single transmitting output and return beam that is reflectively directed along multiple, transverse axes of movement returned provide an indication of movement along the X, Z and Y axes respectively.

BACKGROUND OF THE INVENTION

Laser interferometers have been used to a limited extent to effect precise movement of a machine element along a power driven axis of movement. Usually, in the event such a measuring system was actually built into a machine, it comprised a semitransparent beam divider operative to divide the single entrant light beam from a laser light source into two split beams, as well as subsequently recombine the split beams to provide interference patterns or light fringes. However, a single variable length light beam from the interferometer would simply direct it along one axis to a retroreflector or corner cube mounted on an element carried for movement along a single axis paralleling the single output beam. The retroreflector in turn returned the single beam directly to the interferometer where it was recombined with the reference beam to actuate a pair of associated photodetectors. In such a case, however, the interferometer was connected and operated only to measure machine movement along a single axis.

In addition to the foregoing, an arrangement was likewise available for sharing a single light beam by means of a beam divider to actuate a pair of separate laser actuated interferometers that are individually and selectively operative to measure distance along a pair of different axes of movement. Although this arrangement was operative to effect precise measurement of movement along two different axes, it required two separate interferometers and two completely separate and independently operable optical systems for effecting measurement along the different axes. In other words, this system simply provided a means for sharing a single laser light source.

SUMMARY OF THE INVENTION

According to this invention, a single laser interferometer is connected to reflectively project a single variable length measuring beam along multiple axes of machine movement for selectively measuring the distance traversed along a single machine axis or segment of movement. In a principal embodiment, a machine tool is provided with a frame having a worktable horizontally movable along an X axis and an upright transversely movable along a Z axis. A tool carrying cutter support is movably carried by the upright for vertical movement along a Y axis.

A single laser interferometer is secured to the worktable and provided with a single semitransparent beam divider that functions both to divide an input beam from the laser into a fixed length reference beam and a variable length output beam. Subsequently, the single beam divider functions to recombine phase differentiated portions of the internal reference beam with reflectively returned portions of the single measuring beam to provide interference patterns or light fringes.

The arrangement is such that parallel output and return measuring beam segments for the X axis are defined between the single interferometer secured to the movable work table and the cooperatively disposed, stationary right angled reflective beam bender fixedly secured to the frame. In like manner, parallel output and return measuring beam segments for the Z axis are defined between the stationary reflective beam bender fixedly secured to the frame and the movable beam bender secured to the transversely movable upright. Likewise, parallel output and reflectively returned measuring beam segments for the Y axis are defined between the retroreflector secured to the spindle head for vertical movement therewith, and the stationary, reflective beam bender fixedly secured to the upright.

To effect precisely controlled movement, the worktable is initially moved to a preselected position along the X axis; the column to a preselected position along the Z axis; and the spindle head is moved to a predetermined position along the Y axis. These initial positioning movements establish the original reference positions after which the single counter associated with the single interferometer is manually preset to a zero reference position. In its zero preset position, the single reference counter is then responsive to the single multiple axis reference beam comprising one continuous output beam together with a continuous parallel return beam reflectively directed along the X, Y and Z axes. The reflective interconnection of the single laser measuring beam is then operative to indicate a precise segment of movement along a particular individual axis to the extent required by selective actuation of the power source for effecting movement along that particular axis.

It is a general object of the invention to provide an improved, simplified laser interferometer measuring system for a machine tool.

It is a further object of the invention to provide a single laser interferometer having a reflectively interconnected variable length measuring beam operative to measure a selected single axis measured segment, as a portion of a continuously and reflectively interconnected multiple axis measuring beam that is continuously reflected along a plurality of axes.

It is another object of the invention to provide a single laser interferometer actuated by one laser and operative to provide a single variable length output beam comprising a plurality of reflectively interconnected segments and a terminal retroreflector operative to return the output beam along a like number of parallel return path segments reflectively interconnected to the output interferometer for there combining with a single reference beam.

Another object of the invention is to measure incremental errors resulting from the resolver/ball screw position feedback control system and to provide ready means of correcting machine positioning errors due to: (1) lead errors in the screw and nut drive mechanism; (2) temperature growth; and, (3) lost motion of the axes drive.

A still further object of the invention is to provide a greatly improved positioning accuracy in any selected axis of movement along a plurality of axes by using a single multiple axis measuring beam reflected along a corresponding plurality of axes of movement.

The foregoing and other objects of this invention which will become more fully apparent from the following detailed description, may be achieved by the exemplifying apparatus depicted and set forth in the specification in connection with the accompanying drawings in which:

DESCRIPTION OF THE PREFERRED EMBODIMENT

Figure 1:
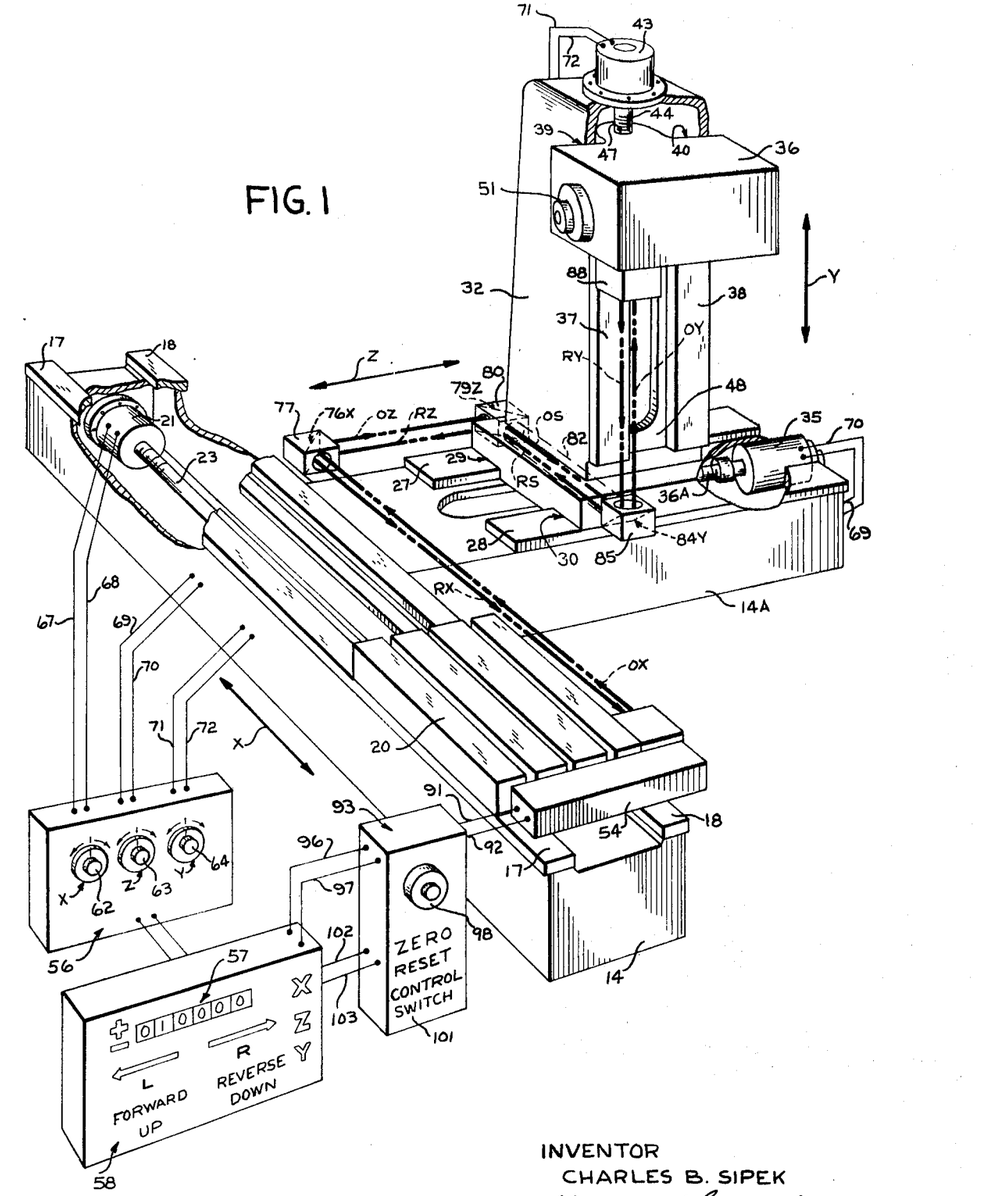
FIG. 1 is a view in perspective, of the entire machine including a single multiple axis measuring beam for the X, Y and Z axes together with coordinate power drives for the same axes.

Referring particularly to the drawings, a multiple axis laser interferometer for effecting extremely precise length measurements over a plurality of different axes is embodied in a machine represented in perspective form in FIG. 1. To clarify the operational relationship, the machine shown principally in perspective in FIG. 1 is represented in part schematically, and in part in fragmentary schematic form. The machine comprises as a principal supporting structure, a horizontally extending machine bed 14 having secured thereto a rearwardly extending machine bed 14A. The machine beds 14 and 14A comprise one rigid machine structure for supporting a worktable 20 and tool supporting spindle head 36 during predetermined relative movement.

To accomplish this, the machine bed 14 is provided with a pair of horizontally extending, parallel ways 17 and 18 respectively disposed to engage complementary ways presented by the underside of a horizontally movable work supporting table 20. To effect selective horizontal movement of the worktable 20 along the ways 17 and 18, a table drive motor 21 is secured within the leftward end of the bed 14. The table drive motor 21 is connected to rotatably support and drive the leftward end of a helically threaded table screw 23 journalled at its rightward opposite end in an axially aligned bearing (not shown) within the rightward end of the machine bed 14. For effecting selective directionally controlled movement of the worktable, a table screw nut (not shown) is secured in well-known manner to the underside of the worktable in axially aligned position to engage the rotatable table screw 23. Upon energizing the table drive motor 21, the table screw 23 is rotatable in a direction to effect the desired leftward or rightward movement of the worktable 20 along the X axis guideways 17 and 18 at a predetermined desired rate.

In a similar manner, the rearwardly extending portion of the bed 14A is likewise provided with parallel, horizontal guideways 27 and 28 extending in a rearward direction transverse to the direction of the table guideways 17 and 18. The bed guideways 27 and 28 are disposed to slidably engage parallel, complementary guides 29 and 30 presented by the underside of an upwardly extending tool supporting column support 32.

The spindle upright 32 or column structure is selectively movable toward or away from the table supporting bed 14 by selective energization of a cooperating drive motor 35 secured within a rearwardly extending portion of the bed member 14A. The motor 35 is connected to effect directionally controlled rotation of a cross-feed screw 36A connected to engage a complementary cross-feed nut (not shown) secured to the underside of the column structure 32 in well-known manner.

To support a cutting tool for movement relative to the worktable 20, the upright column structure 32 is provided with a pair of spaced apart vertically upstanding column ways 37 and 38 disposed to slidably guide a spindle head 36 for selective vertical movement. To accomplish this, the inner rearward portion of the spindle head 36 is provided with a pair of downwardly extending, spaced apart guideways at the positions generally indicated at 39 and 40 in a manner to slidably engage the complementary, vertically extending ways 37 and 38 presented by the upright 32. A spindle head drive motor 43 is mounted on the upright column 32 for selective energization to effect directionally controlled vertical movement of the spindle head 36 at a predetermined desired rate. The drive motor 43 is connected to rotate a helically threaded vertical drive screw 44 adapted to threadedly engage a drive nut 47 fixedly carried by the spindle head 36. It will be apparent that the vertically depending spindle head drive screw 44 extends downwardly within the upright 32. It is not deemed necessary to show the arrangement between the described cooperating parts in complete detail since similar structures are known in the machine tool arts. For example, the usual gibs (not shown) are provided to retain the worktable 20, column 32 and spindle head 36 in slidable engagement with the respective supporting members for movement along the X, Z and Y axes as respectively shown and described.

To support a cutting tool in operative relationship to a workpiece mounted on the relatively movable worktable 20, a tool receiving spindle 51 is rotatably journalled in the spindle head 36 for selective rotation about a horizontal axis. A rate controlled power drive mechanism (not shown) carried within the spindle head 36 is operatively connected in well-known manner to effect selective rate controlled rotation of the tool receiving spindle 51.

As shown in FIG. 1, energization of the table drive motor 21 is operative to effect selective directionally controlled movement of the worktable 20 along the X axis. In a similar manner, energization of the column drive motor 35 rotates the cross-feed screw 36A for effecting directionally controlled movement of the column along the Z axis; and, energization of the spindle head motor 43 effects rotation of the screw 44 for moving the spindle head 36 in a selected vertical direction along the Y axis. To perform a machining operation on a workpiece carried by the worktable 20, the spindle head 36 is coordinately movable relative thereto by effecting the required coordinate energization of the table drive motor 21, the cross-feed motor 35, and the spindle head drive motor 43. To accomplish such coordinate movement, a servo drive control apparatus (not shown) may be provided to effect the necessary selective coordinate energization of the motors 21, 35 and 43. For use in coordinated relationship with such a servo drive apparatus or for independent use, means are provided to effect manually initiated servo control of the motors 21, 35 and 43 as controlled by the multiple axis laser interferometer 54.

To effect selective manually initiated energization of the motors 21, 35 and 43, there is provided a central power control circuit contained within the cabinet 56 connected in the usual manner to a source of power. The control circuit within the cabinet 56 is operative both to initiate energization of a selected motor as well as to control the extent of movement along a selected axis as determined by presettable indicia 57 presented by a selectively resettable counting circuit 58.

As schematically illustrated in FIG. 1, the control circuit cabinet 56 is provided with selectively rotatable directional control knobs 62, 63 and 64. A table control knob 62 is leftwardly rotatable to provide an energized output circuit from the control 56 to energize output conductors 67 and 68 connected to effect energization of the table drive motor 21 for effecting the desired leftward movement of the worktable 20. The control circuit within the cabinet 56 is so arranged that the extent of leftward movement of the control knob 62 determines the rate of leftward table movement and the time control knob 62 is retained in a leftwardly biased position determines the extent of leftward table movement according to a visual inspection of the counting apparatus 57. In a similar manner, the control knob 62 is rotatable in a rightward direction to effect energization of the output conductors 67 and 68 for energizing the table drive motor 21 to effect a selected rightward movement of the worktable 20. In either case, the control knob 62 is resiliently returnable to a central neutral position irrespective of whether it has been manually rotated from neutral position in a leftward or rightward direction. As customary in this general type of control, a gradual manually controlled return of the knob 62 to neutral position by an operator effects a corresponding preselected reduction in the leftwardly initiated movement of the worktable 20.

In a similar manner, a cross-feed control knob 63 is leftwardly rotatable from a resiliently biased neutral position to energize conductors 69 and 70 for energizing the cross-feed motor 35 to effect a selected leftward or forward movement of the spindle head carrying upright 32. In like manner, the control knob 63 is rightwardly rotatable from its resiliently biased neutral position to energize the conductors 69 and 70 for effecting the required energization of the cross-feed motor 35 to effect rightward or rearward movement of the spindle head upright 32.

A selected downward movement of the spindle head 36 may be manually initiated by effecting a manual rightward rotation of a spindle head control knob 64 to energize the output conductors 71 and 72 respectively. In a similar manner, the control knob 64 is manually rotatable a selected distance leftwardly from its resiliently returnable position to energize the conductors 71 and 72 for energizing the drive motor 43 to effect selected upward movement of the spindle head 36 along the column upright guideways 37 and 38.

The single laser interferometer 54 is connected to provide a single variable beam measuring signal comprising a plurality of reflectively interconnected output segments together with a retroreflectively returned plurality of reflectively interconnected return segments. This single variable length measuring beam comprising the plurality of interconnected beam segments is operative to detect any change in length of one of the segments. To accomplish this, the variable length output beam is transmitted from the interferometer 54 secured to the worktable 20 as a first beam segment identified as OX extending to the angular, reflective face 76X carried by a corner bracket 77 fixedly secured to the supporting bed 14A. From the reflective surface 76X, the output beam continues rearwardly along a beam path OZ to an angular reflective surface 79Z carried by a corner bracket 80 fixedly secured to a forward, rightward portion of the upstanding column 32. From the angular reflective surface 79Z, the output beam then continues transversely along a beam path OS extending through a transverse spacing tube 82 extending through a lower forward portion of the upright 32. That portion of the continuous output beam identified as OS extends between the angular reflector 79Z affixed to the column bracket 80 to an annular reflective surface 84Y that is carried by a corner bracket 85 fixedly secured to the opposite side of the base of the column upright 32. From the angular reflective surface 84Y, the continuous output beam is reflectively directed vertically upward along a beam path segment OY to a retroreflector contained within a housing 88 fixedly secured to the spindle head 36 for vertical movement therewith along the Y axis.

As will hereinafter be more fully explained, the retroreflector within the housing 88 is disposed to reflectively return the OY segment of the output beam along a parallel return beam path identified as RY. The return or RY segment of the variable length beam is returned to the angular reflective face 84Y affixed to the corner cube 85 and thence transversely along a spacing beam path identified as RS extending through the fixed transverse tube 82 within the base of the upright or column 32. The continuous return segment continues along the beam path RS to the angular reflective surface 79Z and thence is reflectively directed forward along a beam path RZ that is parallel to the output beam path segment OZ. From the angular reflective surface 76X secured to the corner bracket 77, the beam segment RZ continues along a beam path RX to the interferometer where it is combined with phase differentiated portions of a fixed length reference beam to provide interference fringe patterns for selectively activating the counter 57 as will hereinafter be more fully explained.

To briefly reiterate, the variable length output beam from the interferometer 54 comprises the reflectively interconnected output beam segments OX, OZ, OS and OY to the terminal return reflector provided by the retroreflector within the bracket 88 secured to the spindle head 36. From the spindle head 36, the continuous output beam is reflectively returned along the parallel beam path segments identified as RY, RS, RZ and RX to the interferometer 54. It should be noted that X axis measurement is effected by a change in length of the parallel output and return segments OX and RX extending between the movable interferometer 54 and the stationary angular reflector 76X carried by the corner bracket 77 and fixedly secured to the bed 14A. In similar manner, Z axis movement is measurable by a change in length of the continuous Z axis beam segments OZ and RZ extending between the stationary angular reflector 76X and the transversely movable angular reflector 79Z.

The fixed angular reflective surface 76X and the transversely movable angular reflective surface 79Z delimit output and return beam segments OZ and RZ respectively comprising measurable components of the continuous output and return beams. The parallel spacer beam segments designated OS and RS are of a fixed length extending between the angular reflective surface 79Z and the angular surface 84Y. It will be apparent that the spacer beam segments OS and RS are continuously maintained at the same length and function principally to extend the relative axial range of movement of the interferometer 54 and worktable 20 along the X axis and relative to the stationary angular reflective surface 76X.

The measurable range of movement of the spindle head 36 along the Y axis is delimited by the vertically spaced apart positions of the stationary angular reflective surface 84Y fixedly secured to the column corner bracket 85 and the vertically movable retroreflector carried within the housing 88 affixed to the spindle head 36 for selective vertical movement therewith. As previously mentioned, vertical movement of the spindle head 36 effects a corresponding vertical change in length of the parallel output and return beam segments OY and RY respectively comprising interconnecting portions of the continuous variable length measuring beam.

Selective operation of the interferometer 54 for determining the distance moved along the X, Z or Y axis is effected by selectively initiating individual movement of the worktable 20, reflection 32 or the spindle head 36 in a selected direction along said of movement to be measured. During such a selective measured movement of a particular work support, a dimensional change is effected in only one parallel pair of output and return beam segments, the remaining interconnected beam segments being retained in preset positions. By utilizing the single interferometer 54 selectively in this manner, however, controlled directional movement along each of the three axes may be effected as described.

A single pair of photodetectors in the interferometer 54 is responsive to phase differentiated signals to provide output signals via conductors 91 and 92 to actuate a counting circuit 93. Actuation of the counting circuit 93, in turn, provides directional signals for actuating output conductors 96 and 97 respectively connected to actuate the bidirectional counter 58 thereby activating the indicia to indicate the extent of movement of a machine component along a selected X, Y or Z axis.

After movement of one of the components a predetermined distance as indicated by the preset condition of the indicia 57 presented by the bidirectional counter 58, a control switch 98 is actuatable to selectively rezero the counter indicia 57. Operation of the control switch 98 effects operation of a zero reset control 101 to provide an output signal via conductors 102 and 103 to operate the counter circuit 58 for moving the indicia 57 to zero positions. With the indicia 57 returned to zero position, a selected one of the power actuating control knobs 62, 63 or 64 is selectively rotatable in the required direction to effect power driven movement of a corresponding one of the machine components along an X or Y or Z axis for reactuating a parallel pair of output and return beam segments to reactuate the interferometer 54 for again moving the indicia 57 to a required position.

Figure 2:
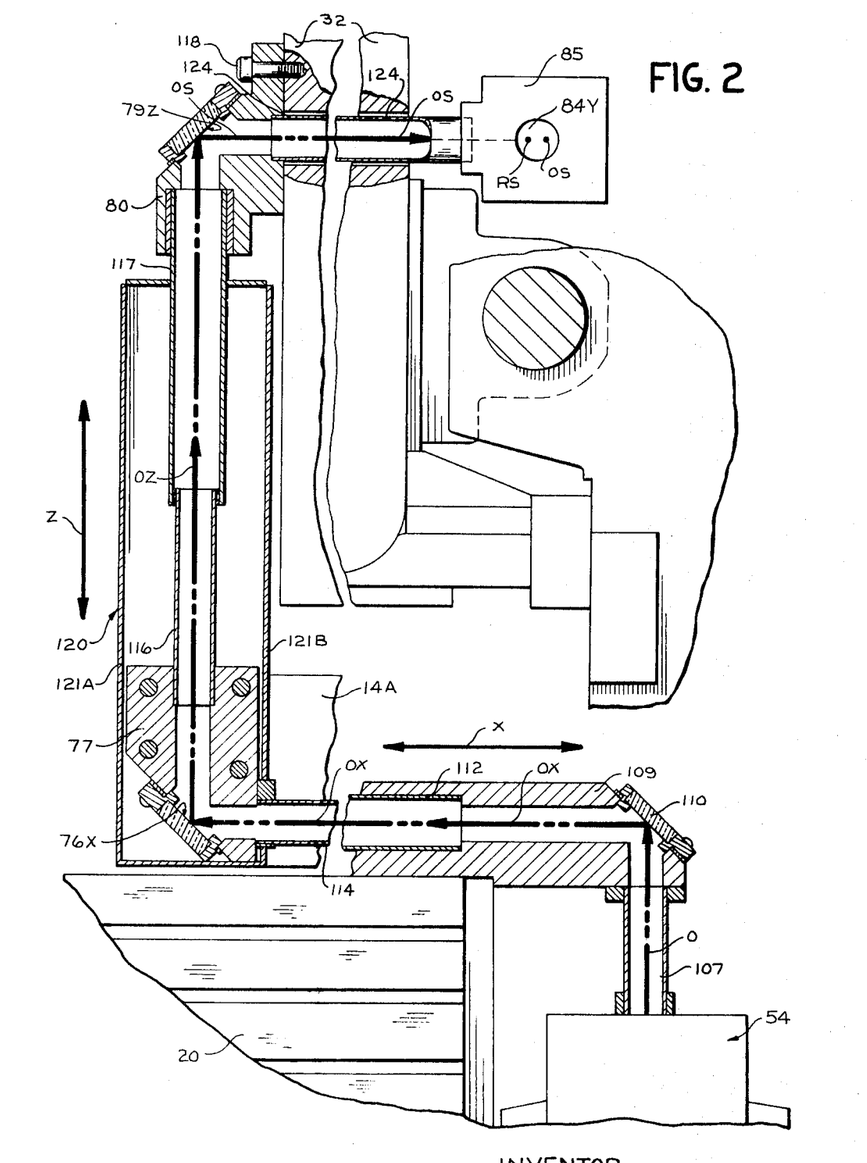
FIG. 2 is an enlarged schematic fragmentary view of the reflective path for transmitting the continuous output beam along the X and Z segments.
Figure 3:
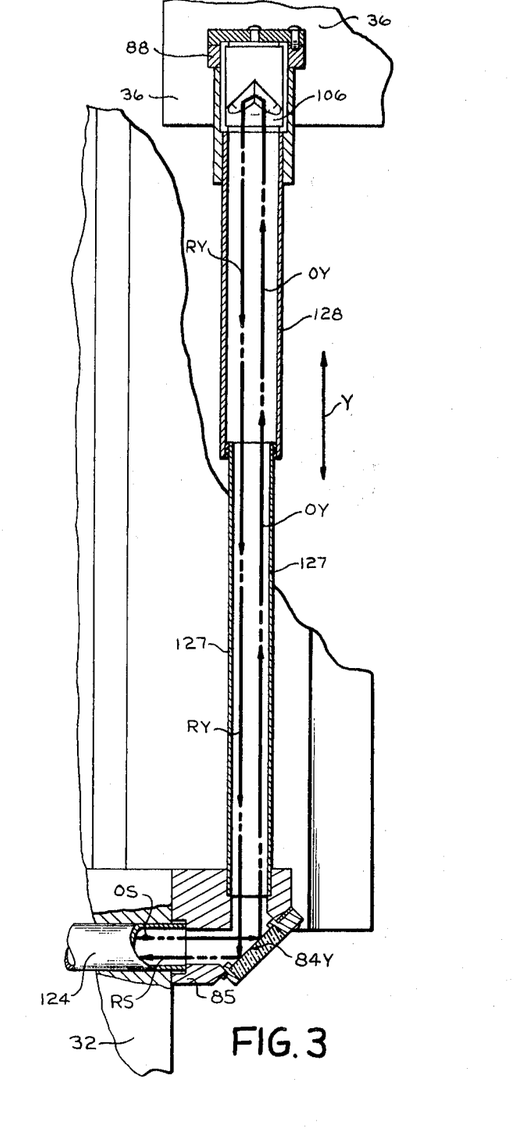
FIG. 3 is an enlarged schematic, fragmentary view of the reflective path for transmitting the beam from the Z segment to the vertical Y segment and the reflectively returned path.

The machine structure for transmitting the reflectively interconnected output beam components from the interferometer housing 54 to a retroreflector 106 mounted within a housing 88 fixedly secured to the vertically movable spindle head 36 is illustrated in FIGS. 2 and 3. As shown in FIG. 2, the interferometer housing 54 fixedly secured to the end of the worktable 20 for axial movement therewith is connected to direct a variable length output measuring beam O outwardly into a tube 107. The tube 107 is interconnected between the housing for the interferometer 54 and a support housing 109 fixedly secured to the table 20 for axial movement therewith. The variable length output beam O emanating from the interferometer 54 is directed along a beam path to an angular reflective surface presented by a reflector 110 fixedly secured to the housing member 109. From the angular reflector 110, the output beam O is reflected at right angles along the beam path identified as OX into the tubular opening within the housing 109 and through the enlarged telescoping tube 112 fixedly mounted at its rightward end within an enlarged tubular opening formed in the housing 109. During movement of the table 20 in either direction along the X axis, it will be apparent that the housing 109 secured thereto as well as the telescoping tube 112 are carried for selective corresponding movement. Thus, the axially movable telescoping tube 112 is continuously maintained in axial sliding engagement with a cooperating telescoping tube 114 of slightly smaller diameter that is fixedly secured at its leftward end within a tubular opening formed in the corner bracket 77. From the angular reflector 110, therefore, the X axis measuring beam OX is transmitted via the interconnecting telescoping tubes 112 and 114 to the angular reflector 76X carried by the stationary corner bracket 77 fixedly secured to the leftward stationary portion of the rearwardly extending machine bed 14A.

A rearwardly extending tubular opening formed in the stationary corner bracket 77 is disposed to support a telescoping tube 116 having slidable engagement with an enlarged telescoping tube 117 secured at its rearward end within an enlarged tubular opening formed in a corner bracket 80 fixedly secured to the column upright 32 by means of fillister head screws 118. In addition to the slidably interconnected telescoping tubes 116 and 117, there is provided a stationary arcuately formed protective cover 120 fixedly secured at its forward end to the stationary corner bracket 77 in overlying protective relationship to the telescoping tubes. The arcuately formed protective cover 120 is provided with downwardly depending sidewalls 120A and 120B extending forwardly with the arcuate upper portion (not shown).

From the stationary angular reflector 76X, the continuous variable length output beam OX is reflected rearwardly along the Z axis beam segment path OZ. The rearwardly reflected output beam OZ, in turn, is reflected transversely by the angular reflective face 79Z along the fixed length spacing beam OS. The fixed length transverse spacing beam OS is directed through a transverse tube 124 secured at its leftward end within an enlarged tubular opening formed in the corner bracket 80. A fixed length tube 124 extends through the base of the column upright 32 and is supported at its rightward end within an enlarged tubular opening formed in the corner bracket 85 fixedly secured to the rightward base of the column upright 32 as shown in FIGS. 1, 2 and 3.

From the angular reflective face 84Y carried by the corner bracket 85, the transverse spacing beam OS is reflected vertically upward along a vertically disposed beam path identified as OY within a small diameter telescoping tube 127 secured at its lower end within a tubular opening formed in the corner bracket 85. To provide a protected beam path, the telescoping tube 127 is slidably engaged within a larger diameter telescoping tube 128 that is fixed at its upper end within a tubular opening formed in the retroreflector housing 88, the latter being carried directly by the vertically movable spindle head 36. The retroreflector 106 is provided with three orthogonal, internal reflective surfaces adapted to reflectively return the output beam OY along a parallel return path identified as RY. The return segment of the beam RY is directed through the interconnected, telescoping tubes 128 and 127 as shown in FIGS. 1 and 2. As shown in FIG. 3, the return beam RY is again reflected by the angular reflective face 84Y which directs the returning beam along a transverse spacing path RS as shown in FIGS. 1 and 3. Although not shown in FIG. 2, it will be apparent that the return beam segments RS, RZ, RX and R are respectively spaced downwardly in parallel relationship to the output beam segments OS, OZ, OX and O. In other words, as previously explained, the return beam segments are successively and reflectively returned by the reflective faces 79Z, 76X and 110 for return to the interferometer 54.

Figures 5, 6, 7, 8:
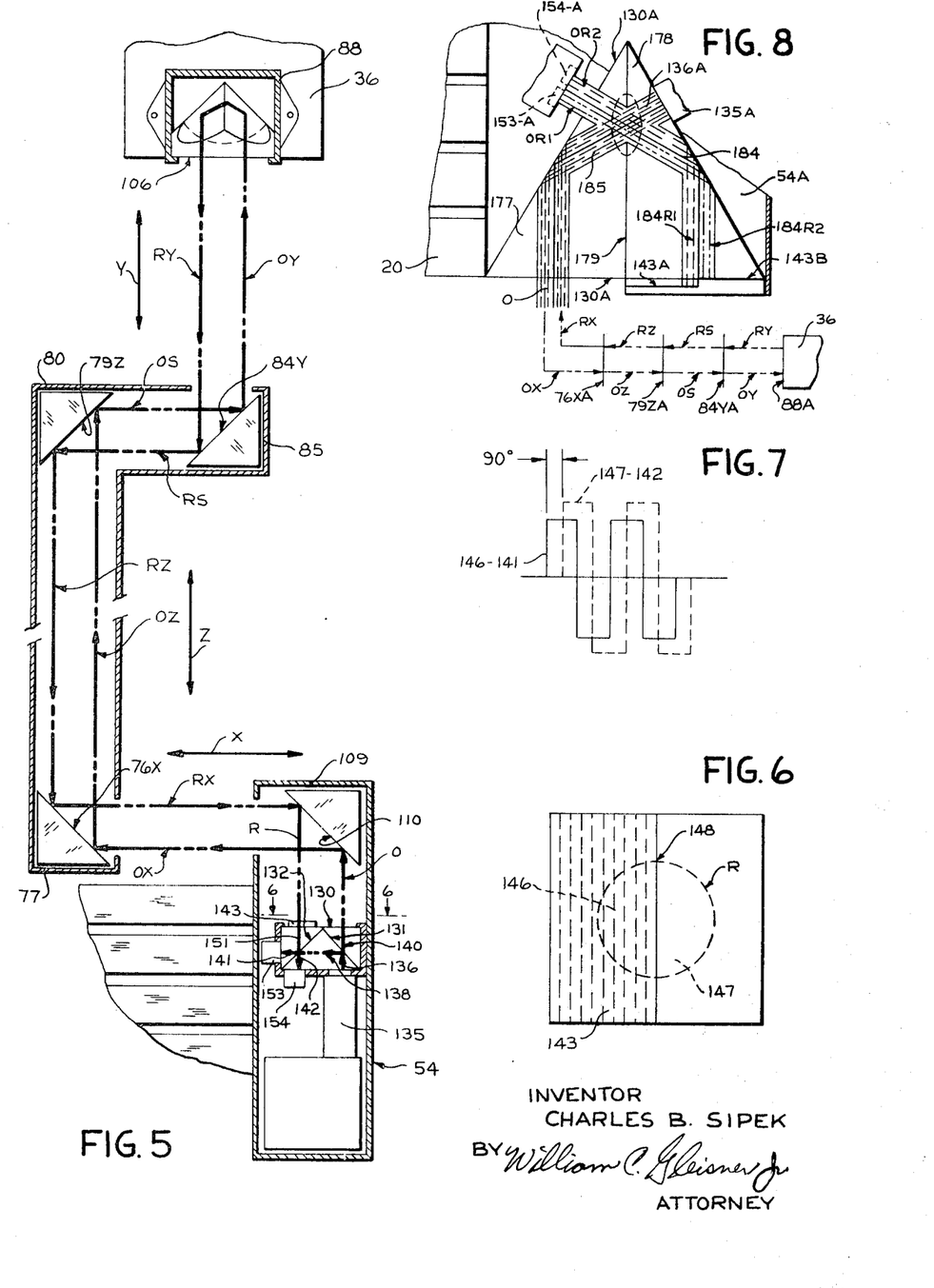
FIG. 5 is an exploded schematic view of a multiple axis bidirectional interferometer with an associated pair of photodetectors selectively actuated thereby.
FIG. 6 is an enlarged plan view of the quarter wave, phase differentiating plate interposed in the single, multiple segment variable length measuring beam.
FIG. 7 is a schematic drawing of square waves spaced in quadrature.
FIG. 8 is a view in side elevation of a unitary prismatic element illustrating the laser input beam and showing the phase retarding in the reference beam by a stepped internal reflective surface.

In FIG. 5 there is illustrated the multiple axis laser interferometer in fragmentary schematic form together with the associated multiple axes traversed by the variable length measuring beam. As shown in FIG. 5, a unitary beam projecting prismatic element 130 is mounted within an enclosure formed in the housing for the interferometer 54. Actually, the interferometer 130 comprises essentially a unitary prismatic element including three prisms that are adhesively secured together along interfaces 131 and 132 respectively. The interface 131 comprises a partially silvered surface to constitute a partially light transmissive, partially light reflective beam splitting surface between the adjacently associated prisms. In a similar manner, the interface 132 is partially silvered to constitute a light transmissive, partially light beam splitting surface between the associated prisms. Thus, the unitary prismatic element shown in FIG. 5 is provided with two angularly spaced apart, light beam splitting surfaces or beam splitters 131 and 132 respectively.

In rearwardly spaced relationship to the prismatic interferometer 130, there is provided a laser housing 135 carried within the interferometer housing 54. The laser 135 is adapted to direct an intense output beam 136 of monochromatic light toward the semisilvered beam dividing interface 131. The beam splitter 131 operates in well-known manner to divide the laser output beam 136 into two split beams 138 and 140 respectively. The internally reflected split beam 138 constitutes a fixed length reference beam directed toward the semireflective beam splitter 132, which again divides the reference beam 138 into two separate reference beam components 141 and 142.

From the beam splitting interface 131, the other half of the divided beam 136 is directed outwardly as one-half of the variable length output beam 140. The variable length split beam 140 is directed outwardly from the unitary prismatic element along a coincidental variable length beam path identified as O. The variable length beam O is transmitted by the angular reflector 110 along an X axis beam path identified as OX in FIG. 5. As schematically there shown, the OX beam is, in turn, transmitted at right angles by the angular reflective face 76X along a rearwardly directed path OZ. As hereinbefore explained, the continuous rearwardly directed beam OZ is reflectively directed at right angles by the angular reflective face 79Z along a fixed length transverse path identified as OS. The beam OS, in turn, is transversely directed by the angular face 84Y along the beam path OY to the retroreflector 106 within the housing 88. Preferably, the retroreflector 106 comprises a trihedral prism having three orthogonal reflective surfaces. Thus, the retroreflector provides a corresponding three internal reflections for maintaining exact parallelism between an input beam OY and a return output beam RY. As hereinbefore explained, the continuous return beam RY is transversely reflected by the angular reflective face 84Y along a return path RS, the latter being again reflected at right angles by the angular face 79Z along the continuous path RZ. In like manner, the continuous RZ variable length beam is again reflected by the angular reflective face 76X along the beam path RX. The continuous beam path RX is likewise reflected at right angles by the angular reflector 110 along the continuous path R directed toward the prismatic element of the interferometer 130.

Partially interposed in the return pathway of that portion of the measuring beam identified as R is a quarter wave, phase modifying plate 143 as shown in FIGS. 5 and 6. The transparent, phase modifying plate 143 divides the returning beam R as indicated in FIG. 6 into the two components 146 and 147 preferably spaced in quadrature. The phase differentiating plate 143 divides the returning beam R into the two symmetrical components 146 and 147 along a line indicated at 148. The symmetrical, divided beam components are directed forwardly along the divided reference beam path 151 schematically indicated within the unitary prismatic element 130 in FIG. 5. The phase differentiated beam components directed along the path 151 are then divided by the semireflective interface 132 into separate beams respectively coincidental with the reference beam components identified as 141 and 142. It will be apparent, therefore, that the reference numerals 141 and 142 identify separate reference beam portions respectively combined with variable length phase differentiated components from the beam path 151 to activate the photodetectors 153 and 154 respectively.

As previously explained, the light signals indicated at 141 and 142 in FIG. 5 comprise the divided reference beam components 138 combined with the internal, phase differentiated beam components to provide separate interference fringe patterns respectively coincidental with the signals 141 and 142 to operate the light sensitive photodetectors 153 and 154.

The transparent phase differentiating plate 143 is so interposed in the path of the returned measuring beam R as to provide two beam components spaced in quadrature as indicated in FIGS. 5 and 6. In being recombined with the fixed length reference beam components 141 and 142, the coincidentally directed phase differentiated beam components provided in the returning beam R and therefore in the continuing reference beam path 151 within the prismatic element 130 are disposed to provide light signals for activating the photodetectors 153 and 154. In consequence, the photodetectors 153 and 154 receive sinusoidal voltage signals which vary in phase both in time and space by 90°. Thus, the photodetectors 153 and 154 provide signals to indicate the direction, the rate, and extent of relative movement between a pair of relatively movable machine elements.

Figure 4:
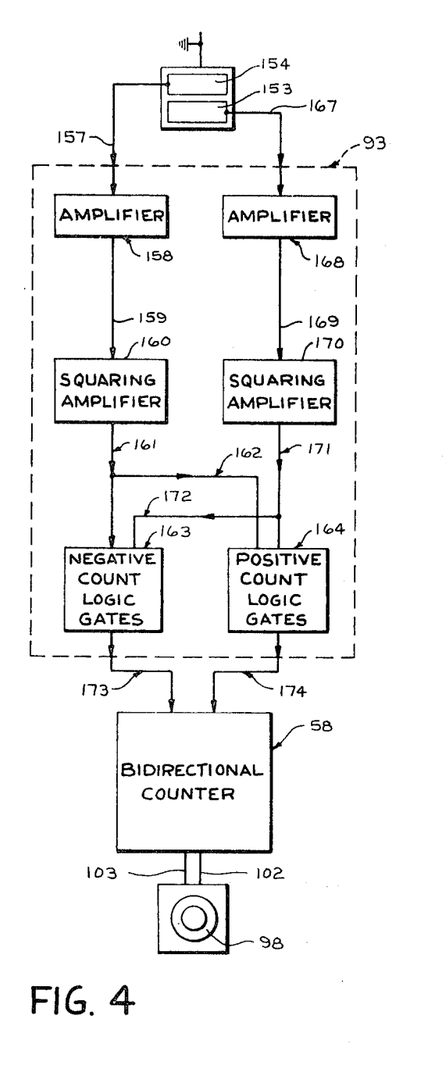
FIG. 4 is an exploded schematic view of a single laser interferometer connected to actuate a bidirectional counter.

After the sine wave signals from the photodetectors are amplified in the counting circuit 93, the quadrature spaced electrical signals 146-141 and 147-142 are represented in the 90° phase shifted positions in FIG. 7. As there illustrated, the electrical signals 146-141 and 147-142 are representative of the amplified and squared signals initiated by signals from the detectors 153 and 154 in FIG. 5. As shown schematically in FIG. 4, one signal is transmitted from the detector 154 along a conductor 157 to an amplifier 158, and thence via a line 159 to a squaring amplifier 160. This one circuit continues via the lines 161 and 162 to actuate the negative and positive count logic gates 163 and 164 respectively. In a similar manner, a quadrature spaced electrical signal from the detector 153 is transmitted via a conductor 167 to an amplifier 168 connected by a line 169 to actuate a squaring amplifier 170. The squaring amplifier 170, in turn, is connected via output conductors 171 and 172 to actuate the positive count logic gates 164 and negative count logic gates 163. From the negative and positive logic gates 163 and 164, signals are then transmitted by conductors 173 and 174 to actuate the bidirectional counter 58.

It will be understood that during operation the bidirectional counter 58 functions to provide a signal representative of one particular segment of motion, either X, Y or Z as hereinbefore explained. To do this, the single pair of cooperating detectors 153 and 154 are respectively operated by corresponding electrical signals received from changes in length of the beam paths associated with the X, Y or Z axes.

After the bidirectional counter 58 has been actuated to provide signal indicative of the length of directionally controlled movement along a particular axis, the reset control 98 is actuatable to reset the bidirectional counter 58 to its zero stating position. To do this, the zero reset control 101 is connected to actuate a reset control circuit contained within the associated cabinet, FIGS. 1 and 4, for providing signals via output conductors 102 and 103 to actuate the bidirectional counter 58 thereby returning the indicia 57 to zero position.

As shown in FIG. 8, the axially movable worktable 20 may be provided with a modified form of interferometer identified as 54A comprising a unitary prismatic element 130A that, in turn, comprises two symmetrical prisms 177 and 178. For both dividing and recombining light beams, the prisms 177 and 178 are secured together along a semisilvered, partially reflective interface 179. A laser 135A constituting a preferred form of light source is secured to the outer face of the prism 178 in a position to project a single output beam 136A toward the partially reflective surface 179 which functions both to divide and recombine the reflectively returned portions of the divided beams. The single entrant light beam 136A is divided into two split beams 184 and 185 by the beam dividing interface 179. The internal reference beam 184 is directed vertically downward by a reflective inner side wall of the one prism and reflectively returned by phase differentiating reflectors 143A and 143B adhesively secured to the base of the prism. From the reflective faces 143A and 143B, phase differentiated reference beam portions 184R1 and 184R2 are reflectively returned along coincidental paths with the output reference beam 184. These beam portions continue from the internal reflective surface of the prism 178 and are directed through the beam recombining interface 179 to be recombined with the reflectively returned portions of the output beam 185 to respectively actuate the photodetectors 153A and 154A. At the same time, the other half of the divided beam from the laser 135A continues from a reflective internal face of the prism 177 to provide the variable length output beam O.

As shown in simplified schematic form in FIG. 8, the single variable length output beam O is reflectively transmitted as a plurality of different segments OX, OZ, OS and OY to a return reflector 88A that may be mounted upon the spindle head 36 for movement therewith. From the reflector 88A, the output beam is reflectively returned along a coincidental path illustrated as beam segments RY, RS, RZ and RX to the single coincidental return beam O. The coincidental return beam O is then directed along the same beam path and internally reflected by the internal wall of the prism 177 along a path coincidental with the original divided output beam 185. The output beam 185 is then reflected by the interface 179 and directed outwardly along paths coincidental with the reflectively returned phase differentiated beam portions 184R1 and 184R2 respectively. Thus, the reflectively returned variable length beam is combined with the respective reference beam portions to provide phase differentiated output beam portions identified as OR1 and OR2 in FIG. 8. As there shown, the output beam portions are disposed to actuate the respective photodetectors 153A and 154A to in turn provide phase differentiated signals for effecting actuation of the counting circuit 93 as hereinbefore described with reference to FIG. 4. As schematically shown in FIG. 8, the transverse lines 76XA, 79ZA and 84YA are considered as being analogous in function to the successive angular reflective surfaces hereinbefore shown and described in connection with FIGS. 1 and 5. Likewise the return reflector 88A in FIG. 8 is adapted to reflectively return a coincidental, parallel return beam comprising successive beam segments R that are respectively coincidental with the output segments O. Thus, the interferometer shown and described in FIG. 8 may be used as a modification of the interferometer shown and described in FIGS. 1, 2, 3 and 5.

Figure 9:
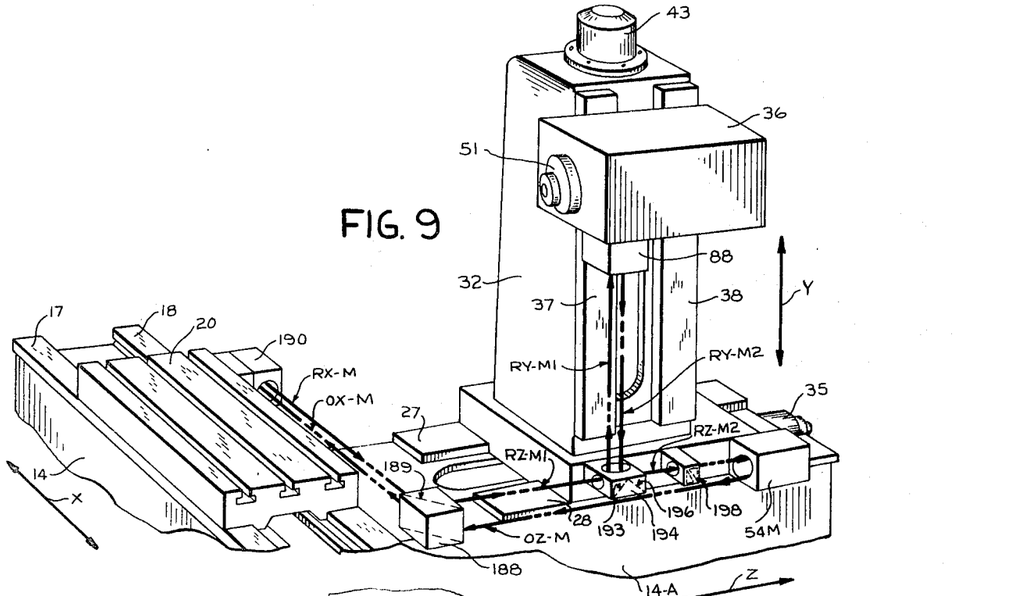
FIG. 9 is an enlarged fragmentary view in perspective of the entire machine including a modification of the invention shown in FIG. 1.
Figure 10:
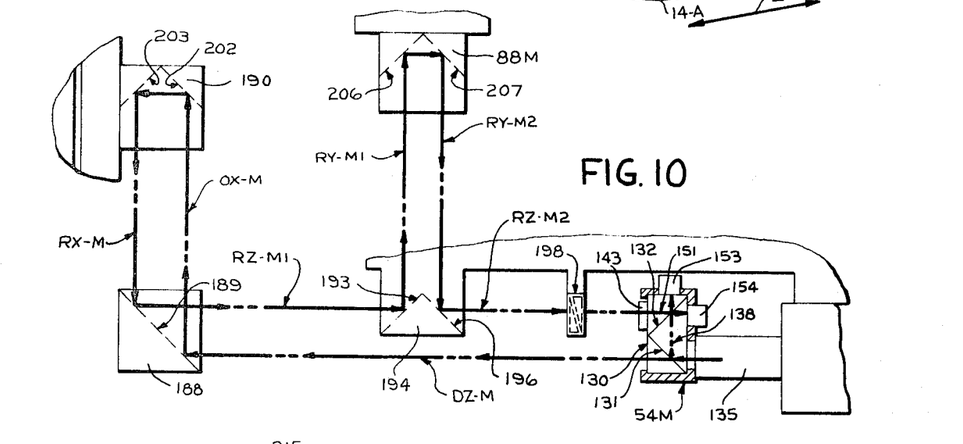
FIG. 10 is an exploded schematic view of a single interferometer measuring system having a continuous measuring beam for multiple axes in combination with an associated continuous interrupted beam for another axis; and, FIG. 11 is an angularly adjustable optical device for selectively aligning the single light beam shown in FIG. 10.
Figure 11:
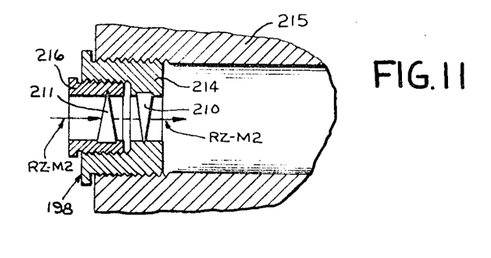

A modification of the multiple axis laser interferometer illustrated and described in FIGS. 1 to 8 inclusive is illustrated and described in FIGS. 9, 10 and 11. The laser interferometer shown and described in FIG. 9 comprises a multiple axis interferometer having a beam interrupting segment to provide a more rigid mounting. The interferometer identified as 54M in FIG. 9 is fixedly secured to the rearward base of the column 32 for transverse horizontal movement therewith along the Z axis. In addition to providing a more rigid mounting, the disposition of the interrelated beam reflecting parts in FIG. 10 results in a greatly improved configuration of the entire machine. Although shown in fragmentary form in FIG. 9, it is emphasized that the interrelated parts comprising the machine are identical to those hereinbefore described with reference to FIG. 1 and operate in identical fashion by effecting selective energization of the table motor 21, column drive motor 35, and spindle head drive motor 43. Thus, the worktable 20 in FIG. 9 may be selectively power driven in either direction along the X axis; the column 32 may be selectively driven in either direction along the Z axis; and, the spindle head 36 may be selectively driven along the vertical Y axis.

The interferometer 54M is fixedly secured to the rearward portion of the upright column 32 in a position to project an output beam directly forward along a path identified as OZ–M. A corner bracket 188 secured to the frame 14A is provided with an angular reflective face 189 adapted to reflectively direct the output beam OZ–M transversely along a beam path identified as OX–M. A retroreflector is mounted within a support bracket 190 at the opposite or leftward end of the worktable 20. The retroreflector 190 is adapted to receive the output beam OX–M and reflectively return along a parallel path a return beam segment identified as RX–M. The RX–M beam segment is again transversely directed by the beam bender or reflective face 189 along a path identified as RZ–M1. This beam segment, in turn, is reflected vertically upward along a beam path identified as RY–M1 by an angular reflective face 193 carried on the triangular prismatic reflector 194. The reflector 194 is fixedly secured to the base of the column 32 in vertical alignment below the retroreflector 88 carried by the vertically movable spindle head 36. The upwardly directed beam RY–M1 is reflected vertically downward along a parallel spaced beam path by the retroreflector 88 as a beam component or segment RY–M2. The downwardly directed beam segment RY–M2 is reflected rearwardly by a beam bender or angular reflector 196 secured to the prismatic reflector 194. From the angular reflector 196, another Z axis segment identified as RZ–M2 is directed rearwardly through a beam aligning apparatus 198 to the interferometer 54M. The laser interferometer 54M is identical both in its constituent parts and its mode of operation to the interferometer 54 hereinbefore shown and described in FIG. 5.

As shown schematically in FIG. 10, the laser 135 is carried by the interferometer 54M in position to direct an intense beam of light forwardly to the semisilvered, partially reflective beam dividing angular interface 131. It will be recalled that the unitary prismatic element 130 comprising the interferometer 54M is provided with angularly diverging partially reflective interfaces 131 and 132. The interface 131 divides the input beam from the laser 135 into a fixed length reference beam 138 and an outwardly directed measuring beam segment OZ–M to the reflective beam bender 189 carried by the corner bracket 188. The angular reflector 189 projects a transverse beam identified as OX–M along the X axis to one angular reflector provided by the retroreflector 190 which is selectively movable along the X axis upon corresponding movement of the worktable 20. From reflector 202, the laser beam continues to a second reflective surface (not shown) of the retroreflector and thence via a third reflective surface 203 along a parallel output beam path RX–M. The return beam is continued at right angles by the reflector 189 along the transverse beam path RZ–M1 to the angular reflector 193 presented by the beam interrupting prism 194. From the reflector 193, as explained, the beam is directed upwardly along the path RY–M1 to one angular reflector 20 presented by the vertically movable retroreflector 88M.

After passing through the beam aligning apparatus 198, the return beam RZ–M2 is directed through the transparent, quarter phase modifying plate 143 to provide phase differentiating beam components in the continuing, divided reference beam path 151. The divided reference beam components along the path 151 are respectively transmitted by the semitransparent reflector 132 along separate paths to active the respective photodetectors 153 and 154. It will be apparent that the divided beam components from the variable length reference beam 151 are respectively combined with divided components from the transversely directed internal reference beam 138 to provide phase differentiating signals activating the photodetectors 153 and 154. As hereinbefore explained in connection with FIG. 4, the photodetectors 153 and 154 are in turn operative to selectively actuate the counting circuit 93 for effecting operation of the bidirectional counter 58.

Referring again to FIG. 9, the corner bracket 188 is fixedly secured to the frame 14A and constitutes a fixed reference point for determining the distance moved along the X axis or the Z axis respectively. The continuous reflectively interconnected laser beam segments from the interferometer 54M comprise output beam segments OZ–M and OX–M. The continuous laser beam received by the retroreflector 190 is then transmitted continuously along a return path by the segments RX–M, RZ–M1 RY–M1, RY–M2, and RZ–2 for return transmission as one continuous laser beam directed to the interferometer 54M. In considering measurement along the X axis, it will be apparent that selective movement of the worktable 20 effects corresponding movement of the retroreflector 190 to effect equalized dimensional change in the X axis beam segments identified as OX–M and RX–M respectively.

A selective directional measurement of Z axis movement is effected by Z axis movement of the column 32 to effect a corresponding Z axis movement of the interferometer 54M secured thereto relative to the stationary reflector 189. As this occurs, it will be apparent that bodily movement of the interferometer 54M effects a simultaneous change in measurement of the Z axis beam segments identified as OZ–M and RZ–M1. Inasmuch as both the interferometer 54M and the prism 194 are fixedly secured to the column 32, the Z axis portion of the beam RZ–M2 continuously remains the same length during Z axis movement.

In a similar manner, a dimensional change in Y axis position is effected by moving the spindle head 36 in a selected vertical direction to effect corresponding movement of the retroreflector 88. It will be apparent that vertical movement of the retroreflector 88 effects simultaneous dimensional changes in the Y axis laser beam segments identified as RY–M1 and RY–M2.

The beam aligning apparatus 198 comprises a pair of thin, wedge prisms 210 and 211 respectively supported for individual, or combined angular positioning rotation in the path of the return beam RZ–M2 as shown in FIG. 11. The thin prism 210 is supported within a carrier 214 mounted for selective angular positioning movement within an assembly tube 215 shown in fragmentary form in FIG. 11 and encompassing the returned beam. In addition to supporting the prism 210 for selective angular adjustment, the tubular carrier 214 supports a concentric tubular carrier 216 for simultaneous adjusting movement therewith. The concentric carrier 216, in turn, is arranged to output axially aligned spaced apart thin prism 211. By mans of this arrangement, the carrier 216 is angularly adjustable within the carrier 214 in a manner to effect independent angular adjustment of the thin prism 211 relative to the spaced apart prism 210. Thus, by selective independent or coordinate angular adjustment of the carriers 214 and 216, the prisms 210 and 211 are angularly relative to one another, or coordinately to effect the necessary aligning adjustment of the return beam RZ–M2. Preferably, the carriers 214 and 216 are mounted for selective independent or coordinate angular, rotary motion. In other words the prisms 210 and 211 are supported for selective rotary motion, but not for relative axial movement.

Preferably, the laser 135 described in connection with FIGS. 5, 8 and 10 is a single mode, continuous helium-neon gas laser operating at a wave length of 6,328 Angstrom units that is adapted to emit an intense light beam, particularly suited for long path operation of the interferometric length measuring instrument disclosed herein. As known in the art, the word "laser" is an acronym for the complete descriptive phrase "light amplification by stimulated emission of radiation". Inasmuch as the functional use and mode of operation of a laser is well-known in the prior art, it is not deemed necessary to describe the operation of a laser in further detail in the present application.

In referring again to FIG. 1, the laser interferometer 54 is secured to the table 20 for movement therewith along the X axis and the retroreflector 88 secured to the spindle head 36 for vertical movement therewith along the Y axis. Between the interferometer 54 and retroreflector 88 are positioned the transversely extending measuring beam components including (1) OX and RX for the X axis; (2) OZ and RZ for the Z axis; (3) OS and RS for the fixed length spacing beams; and, (4) OY and RY for the vertical Y axis. As shown and described, the worktable 20 and the spindle head 36 are both terminally movable members. Thus, in the system shown in FIG. 1, the laser interferometer 54 is secured to one terminal member identified as the worktable 20, and the retroreflector 88 is secured to the other terminal member identified as the spindle head 36. Between the two terminal members 20 and 36, there is slidably interposed a single movable member identified as the vertical column 32.

To begin with, it reflector emphasized that this system will operate with equal effectiveness by reversing the positions of the interferometer and the retroreflector. In other words, the interferometer can be mounted on the spindle head 36 and the cooperating retroreflector mounted on the worktable 20, assuming the parallel beam segment arrangement remains the same. Furthermore, other relatively movable, power driven members (not shown) can be operatively interposed between the worktable 20 and the spindle head 36 in addition to the column 32. In such a case, an additional concomitant interposition of a fixed reflector and a relatively movable reflector is made in the existing beam path to delimit the range of movement of the newly interposed member.

Although the exemplary embodiments of the invention have been described in considerable detail in order to disclose several forms of practical apparatus incorporating the invention, it is to be understood that the particular structures shown and described are illustrative only, and that the various characteristics of the invention may be incorporated in other structural forms without departing from the spirit and scope of the invention as defined in the subjoined claims.

The principles of this invention having now been fully explained in connection with the foregoing description, I hereby claim as my invention:

1. In a rectilinear positioning mechanism comprising a frame;
    a plurality of members movably carried by said frame for selective independent rectilinear movement relative to one another and including first and second terminal members transversely movable relative to one another;
    a stationary angular reflector secured to said frame in fixed relationship between said terminal members;
    an interferometer secured to said first terminal member including a light source and a beam splitter operative to provide a fixed length reference light beam and a variable length measuring light beam comprising an output light beam directed along a path parallel to the path of movement of said first member and toward said angular reflector secured to said frame;
    a return reflector carried by said second terminal member operative to receive the reflectively directed output light beam from said angular reflector and reflectively return a spaced apart parallel measuring light beam toward said angular reflector and parallel to the path of movement of said second terminal member for continued return transmission along a reflectively directed return path to said interferometer carried by said first terminal member in parallel relationship to the output light beam therefrom;
    means for moving a predetermined one of said terminal members a selected distance; and,
    light beam combining means in said interferometer being operative to combine said reference beam with said reflectively returned measuring beam to produce interference fringes indicating a change in length of said measuring light beam proportional to the rectilinear movement of said members.

2. In a positioning mechanism according to claim 1 including a laser light source carried in position to direct a laser light beam toward said beam splitter in said interferometer for division into a fixed length internal reference beam and an externally directed variable length measuring beam;
    a transparent phase differentiating plate partially interposed in the path of the continuous measuring beam angularly interreflected along different axes between said first and second terminal members to provide separate phase differentiated bidirectional signals in the returned beam; and,
    said light beam combining means in said interferometer being operative to combine separate reference beam signals in said internal laser reference beam with said separate reflectively returned laser measuring beam signals to produce separate bidirectional interference fringe signals indicating both a change in length and direction of change of said measuring light beam proportional to the rectilinear movement and direction of one of said members.

3. In a positioning mechanism according to claim 1 including an intermediate third member movably carried for transverse movement by one of said terminal members for transverse movement relative thereto;
    a beam interrupting roof prism fixedly carried by said member that is disposed to carry said third member, said roof prism being positioned to interrupt one of the reflectively returned beams and direct that beam toward said third member and along a path parallel to the path of movement of said third member; and,
    a retroreflector carried by said third member adapted to receive the beam from said roof prism and return thereto another reflectively returned beam along a parallel path, said roof prism being adapted to, in turn, receive the retroreflectively returned beam and reflectively direct it at right angles onwardly toward said terminal member.

4. In a positioning mechanism according to claim 3;
    light sensitive means actuated by interference fringes from said beam combining means; and,
    counting means connected to be actuated by said light sensitive means for indicating the extent of movement of a selected member.

5. In a positioning mechanism for a machine tool having a frame;
    a pair of members movably carried by said frame for selective relative movement along different axes;

light beam generating interference means secured to the first of said members for relative movement therewith, said interference means including a source of a light beam and light beam dividing means positioned to divide the beam into an internal reference beam and an external variable measuring beam directed outwardly along a path parallel to the axis of movement of said first member;

a stationary angular reflector secured to said frame adapted to receive the variable measuring beam from said interference means and direct a continuous unbroken measuring beam to said second member along an axis parallel to the axis of movement thereof;

angular reflecting means secured to said second member adapted to receive and delimit the extent of an output measuring beam relative to said frame reflector, said angular reflecting means adapted to direct a return measuring beam along an axis parallel to the axis of movement of said second member;

said stationary angular reflector being adapted to receive the reflectively returned measuring beam from said angular reflecting means carried by said second member and reflectively redirecting a continuous return measuring beam to said interference means along a spaced apart axis parallel to the axis of the output measuring beam therefrom; and, beam combining means in said interference means operative to combine said reflectively returned continuous variable length measuring beam with said fixed length reference beam to produce interference fringes indicating a change in length of said measuring beam due to a rectilinear change in position of said members.

6. First and second members movably carried for rectilinear relative movement along different angularly disposed axes by support means;

interferometer means including a light beam projector carried by said first member and beam dividing means positioned to divide a light beam from said projector into an internal fixed beam and an external variable length output measuring beam;

a relatively fixed angular reflector secured to said support means positioned to receive the output beam from said interferometer means and angularly reflect a continuous output beam to said second member;

beam reflecting means affixed to said second member adapted to receive the output beam reflected from said fixed angular reflector and retroreflect a continuous return measuring beam thereto for continuous angular return reflection to said interferometer means;

phase differentiating means interposed in the path of the continuous returned measuring beam adapted to provide phase differentiated signals in the beam returned to said interferometer means; and, beam combining means in said interferometer means operative to combine the phase-differentiated signals in the continuous returned measuring beam with separate signal components in said fixed length reference beam to produce phase-differentiated interference fringes indicating a change in the length and direction of the continuous measuring beam.

7. In a positioning mechanism according to claim 6 including a laser light source in said interferometer means adapted to operate as a light beam projector.

8. In a positioning mechanism according to claim 6 including an intermediate third member movably carried for relative transverse movement by said movable first member;

angular beam interrupting means carried by said first member in a position to interrupt one of the continuous beams directed between said interferometer means and said fixed angular reflector secured to said support means and to angularly reflect the interrupted beam toward said third member;

retroreflective means fixedly carried by said third member in position to receive the angularly directed interrupted beam and reflectively return the continuously received beam toward said angular beam interrupting means for completing the transmission of the interrupted beam between said interferometer means and said fixed angular reflector secured to said support means.

9. In a positioning mechanism comprising support means;

a pair of members carried by said support means for relative movement along different axes;

an interferometer including light beam producing and beam dividing means fixedly carried by one of said members for producing fixed length reference beam and a variable length measuring beam;

an angular reflector affixed to said support means adapted to reflect the variable beam along an angular path toward said other member;

reflecting means affixed to said other member adapted to receive the variable beam from said frame reflector and return thereto a continuous variable beam for return angular reflection to said interferometer; and, combining means in said interferometer adapted to combine the continuous reflectively returned variable length beam with the fixed length reference beam to produce interference fringes indicating a change in length of the continuous variable length measuring beam.

10. In a rectilinear positioning mechanism comprising a frame;

a plurality of relatively movable members movably carried by said frame for selective independent rectilinear movement relative to one another, two of said members comprising first and second terminal members transversely movable relative to one another;

a stationary angular reflector secured to said frame in fixed relationship between said terminal members;

a light beam dividing interferometer carried by said first terminal member operative to project an internal fixed beam and a rectilinear measuring output beam toward said angular reflector for reflection along an output path parallel to the path of movement of said second terminal member;

a return reflector carried by said second terminal member operative to receive the output beam from said angular reflector and return a spaced apart parallel return beam toward said fixed angular reflector for continued return transmission along a return path to said interferometer in said first terminal member and in parallel relationship to the output beam therefrom, said interferometer including beam combining means for combining said internal fixed beam with said reflectively returned variable length output beam to provide interference fringes;

power operable means connected to move a preselected one of said terminal members; and counting means actuated by interference fringes from said interferometer for measuring the change in length of the continuous output beam during movement of one of said terminal members.

11. In a positioning mechanism according to claim 10 including a beam dividing laser interferometer carried by said first terminal member and operative to supply two divided beams including an internal fixed length reference beam and a variable length output beam directed to said rectilinear beam projector; and, means to combine the variable length reflectively returned beam with the fixed length reference beam to provide interference fringes indicating a change in distance between one of said terminal members and said stationary angular frame reflector.

12. In a positioning mechanism according to claim 10 including an intermediate third member movably carried for transverse movement by one of said terminal members for transverse movement relative thereto;

a beam interrupting roof prism carried by said terminal member mounting for said third member operative to interrupt one of the return beams therefrom and direct the beam upwardly;

a retroreflector carried by said third member operative to return the received beam from said roof prism and reflectively return thereto a continuous return beam along a parallel path; and said roof prism being operative to receive the return beam from said retroreflector and continue the returned beam onwardly to said terminal member.

13. In a positioning mechanism according to claim 12 including a laser projecting interferometer operative to provide a divided beam including an internal fixed length reference beam and direct a variable length measuring beam to said light projector carried by said terminal member;

phase differentiating means operative to combine the reflectively return beam with the reference beam to provide interference fringes; and, light sensitive means actuated by the interference fringes and being operatively connected to actuate said counting means.

14. In a machine tool having a frame;

a plurality of relatively movable members carried by said frame including two terminal members respectively mounted for transverse movement on said frame;

another of said members being mounted on one of said frame mounted terminal members for transverse relative movement thereto;

light beam dividing interference means including a source of light carried by one of said terminal members for movement therewith and adapted to provide an internal reference beam and an outward projected measuring beam;

a return retroreflector carried by the other of said terminal members for movement therewith;

said movable members being each mounted for relative individual movement on an associated relatively stationary member;

angular reflective means mounted on alternate ones of said relatively stationary and said individually movable members between said spaced apart terminal members, aid angular reflective means being operative to transmit an output beam in one direction between said interference means and said retroreflector and to reflectively return the continuous output beam in a reverse direction from said retroreflector to said interference means on said output terminal member in a manner that the output beam from said interference means is one continuous measuring beam comprising a plurality of reflectively connected output beam segments together with a plurality of reflectively interconnected reverse output beam segments, combining means in said interference means operative to combine the reference beam with the continuous output measuring beam to provide interference fringes connected to indicate the distance moved by a selected one of said members and corresponding to a change in length of the single continuous interreflected output measuring beam.

15. In a machine tool having a frame according to claim 14 having a presettable counting apparatus connected to be selectively actuated in response to actuation of said sensitive means actuated by said interferometer; and, power drive means connected to effect selective independent power driven movement of one of said members.

16. In a machine tool having a frame according to claim 14 including a laser operative to project a beam of light for said interference means carried by one of said terminal members, said interference means comprising a laser interferometer operative to provide two divided laser light beams including a fixed length internal reference beam and a continuous variable length output measuring beam, said laser interferometer being operatively disposed to combine said continuous variable length measuring beam with said fixed length internal reference beam to provide interference fringes indicating the change in length of said continuous reflectively interconnected measuring beam; and, light sensitive means actuated by light fringes from said interferometer.

17. In a measuring apparatus including a frame;

first and second members movably carried by said frame for selective transverse movement;

a light beam projector and light beam interference means carried by said first member including beam dividing means operative to provide divided beams including a reference beam and a variable continuous output measuring beam;

an angular reflector carried by said frame for receiving the output beam from said interference means and transmitting it along a continuous path to said second member;

a return reflector carried by said second member operative to receive the continuous output beam from said angular frame reflector and return thereto a continuous output beam, said angular frame reflector being operative to receive the continuous output beam from said second reflector and reflectively transmit a continuous output beam to said interference means carried by said first member;

transparent phase differentiating means operatively interposed in the return path of the continuous beam reflectively transmitted between said angular frame reflector and said interference means to provide phase differentiated signals; and, beam combining means associated with said interference means operative to combine like components in said reference beam with phase differentiated signals in said returned measuring beam to produce phase differentiated interference fringes to measure a change in length and direction of the reflectively interconnected continuous output beam for indicating the extent of movement of one of said members.

18. A measuring apparatus for a machine having a frame according to claim 17 and having an intermediate third member normally carried by said second member for transverse rectilinear movement thereto;

a reflective roof prism carried by said second member in such position as to be interposed in the return path of the continuous measuring beam from said angular frame reflector for reflecting the continuous beam therefrom upwardly along the transverse path of movement of said third member; and, a retroreflector carried by said third member for position controlling movement therewith and in position to receive the upwardly reflected continuous output beam from said roof prism, said retroreflector being operative to reflectively return a continuous output beam to said roof prism for continuous transmission therefrom through said phase differentiating means and to said beam interference means secured to said first member.

19. A machine tool having a frame;

first and second support members slidably carried by said frame for relative transverse movement;

a third member slidably carried by said second member for transverse movement relative to the rectilinear direction of movement thereof;

a laser interferometer secured to said first member including a beam splitter operative to provide a fixed length reference beam and being operative to direct an output measuring beam parallel to the path of movement;

a first mirror affixed to said frame in position to receive the output beam from said first member in a manner to direct a continuous beam at a right angle along a path parallel to the transverse path of movement of said second member;

a second mirror affixed to said second member operative to receive the beam from said first mirror and in turn reflect a continuous beam at a right angle along a path parallel to the rectilinear path of said third member;

a retroreflective prism carried by said third member operative to receive the output beam from said second prism and to return thereto a continuous reflected measuring beam;

said second mirror being operative to reflectively redirect the returned beam toward said first mirror and said first mirror being in turn operative to continue the returned beam at right angles to said interferometer carried by said first member; and, beam combining means in said interferometer being operative to combine said reference beam with said reflectively returned reference beam to produce interference fringes indicating a change in length of said beam due to a change in the position of a single one of said members.

20. A machine tool according to claim 19 including power drive means connected to selectively move one of said members;

light sensitive means connected to be actuated by interference fringes in said interferometer; and, counting means actuated by said light sensitive means connected to indicate the extent of movement of said member.

21. In a measuring apparatus for a machine having a frame;

first and second terminal members movably carried by said frame for selective transverse rectilinear movement;

an intermediate third member carried by said second terminal member for transverse rectilineal movement relative thereto;

a beam dividing interferometer carried by said first terminal member operative to provide a divided fixed length internal reference beam and to project a variable length output measuring beam parallel to the path of movement of said first terminal member;

an angular reflector fixedly carried by said frame for receiving the output beam from said first terminal member and transmitting it along a continuous output path parallel to the path of movement of said second member;

a first retroreflector carried by said second terminal member operative to receive the output beam from said angular frame reflector and return thereto a continuous and parallel return beam;

said angular frame reflector being operative to receive the return beam from said second member and to reflectively transmit a continuous return beam in the direction of said first terminal member and along a path parallel to the continuous output beam from said first terminal member;

first angular reflective means carried by said second terminal member disposed to reflect the return beam from said angular frame reflector vertically upward along the rectilinear path of movement of said third member;

a second retroreflector carried by said third member for movement therewith in a manner to receive the upwardly directed beam from said first reflective means and operative to return thereto a spaced apart beam along a parallel path toward said second terminal member;

second angular reflective means carried by said second terminal member in position to receive the parallel return beam from said second retroreflector and reflectively continue the return beam along a parallel path toward said first terminal member and to said interferometer carried thereby;

prismatic means associated with said interferometer disposed to combine the reflectively returned beam with the reference beam to provide interference fringes;

light responsive means in said first terminal member actuated by the light fringes from said prismatic means; and, a counter actuated by operation of said light responsive means connected to indicate a change in length of said continuous output and return beams for indicating the rectilineal extent of movement of a single one of said three selectively movable machine members.

* * * * *